US012629315B2

(12) United States Patent
Liu

(10) Patent No.: US 12,629,315 B2
(45) Date of Patent: May 19, 2026

(54) ELECTROMAGNETIC PERCUSSION MASSAGER EMPLOYING ARC MOTION

(71) Applicant: Silver Lining Tech. , Ltd, Shenzhen (CN)

(72) Inventor: Jiawei Liu, Heyuan (CN)

(73) Assignee: SILVER LINING TECH., LTD, Shenzhen (CN)

( * ) Notice: Subject to any disclaimer, the term of this patent is extended or adjusted under 35 U.S.C. 154(b) by 891 days.

(21) Appl. No.: 17/918,181

(22) PCT Filed: Sep. 10, 2021

(86) PCT No.: PCT/CN2021/117605

§ 371 (c)(1),
(2) Date: Oct. 11, 2022

(87) PCT Pub. No.: WO2023/029071

PCT Pub. Date: Mar. 9, 2023

(65) Prior Publication Data

US 2024/0207136 A1 Jun. 27, 2024

(30) Foreign Application Priority Data

Aug. 30, 2021 (CN) ......................... 202122085622.7

(51) Int. Cl.
*A61H 23/02* (2006.01)
*A61H 23/00* (2006.01)

(52) U.S. Cl.
CPC ....... *A61H 23/0218* (2013.01); *A61H 23/006* (2013.01); *A61H 2201/0169* (2013.01); *A61H 2201/123* (2013.01); *A61H 2201/14* (2013.01)

(58) Field of Classification Search
CPC .. A61H 23/0218; A61H 23/006; A61H 23/02; A61H 2201/0169;
(Continued)

(56) References Cited

U.S. PATENT DOCUMENTS

2004/0267173 A1* 12/2004 Mangano ............... A61H 11/00 601/57
2016/0015595 A1* 1/2016 Blenk .................... A61H 19/34 601/70

FOREIGN PATENT DOCUMENTS

CN 107710573 A * 2/2018 ............. H02K 35/02
CN 213666609 U * 7/2021 ............. A61H 7/004
WO WO-2018107656 A1 * 6/2018 ............. A61H 23/02

* cited by examiner

*Primary Examiner* — Tu A Vo
*Assistant Examiner* — Kelsey E Baller
(74) *Attorney, Agent, or Firm* — McClure, Qualey & Rodack, LLP

(57) ABSTRACT

The present invention belongs to the technical field of massage and provides an electromagnetic percussion massager employing arc motion, comprising a bent tube, electromagnetic coils, a circuit control module, a magnetic portion and force transmission assemblies, wherein the electromagnetic coils are arranged outside the bent tube and electrically connected with the circuit control module, the magnetic portion is movably arranged inside the bent tube and comprises magnets, the magnets are linearly arranged inside the bent tube, adjacent magnets are attached together through magnetic attraction or flexible pieces, and when the adjacent magnets are attached to each other through magnetic attraction, at least one of the magnets is provided with circular arc or spherical end faces. Compared with the prior art, the present invention can effectively transmit strokes and is applicable for massage of different body parts at different angles, thereby achieving an improved massage effect.

9 Claims, 3 Drawing Sheets

(58) Field of Classification Search
CPC ...... A61H 2201/1609; A61H 2201/123; A61H 2201/14; A61H 1/0296; A61H 1/005–008; A61H 2205/04
See application file for complete search history.

ELECTROMAGNETIC PERCUSSION MASSAGER EMPLOYING ARC MOTION

TECHNICAL FIELD

The present invention belongs to the technical field of massage and provides an electromagnetic percussion massager employing arc motion.

BACKGROUND TECHNOLOGY

With the development of economy and society and the improvement of material living standard, increasing emphasis is put on quality of spiritual life. In addition, the accelerated pace of modern life and work results in increase of mental and physical stress, and people need to relax from time to time. Therefore, industries related to health care and recreations are booming, and especially, massage devices that can help to release stress and have health care functions have entered public life and are widely favored. However, all existing massage devices employ linear reciprocating motion to achieve percussion massage, the thrust generated is unidirectional, and by holding in hand users cannot comfortably massage different body portions at different angles, and the massage effect is far from satisfactory.

SUMMARY OF THE INVENTION

In view of deficiencies in the prior art, the present invention provides an electromagnetic percussion massager employing arc motion, so as to adapt to massaging of different body parts at different angles, thereby achieving an improved massage effect.

In order to realize the above-mentioned purpose, the present invention provides following technical solutions:

An electromagnetic percussion massager employing arc motion, comprises a bent tube, electromagnetic coils, a circuit control module, a magnetic portion and force transmission assemblies;

the electromagnetic coils are arranged outside the bent tube and electrically connected with the circuit control module;

the magnetic portion is movably arranged inside the bent tube and comprises magnets, the magnets are linearly arranged inside the bent tube, adjacent magnets are attached together through magnetic attraction or connected through flexible pieces, and when the adjacent magnets are attached through magnetic attraction, a surface of at least one of the adjacent magnets is configured to be arc-shaped or spherical; and the force transmission assemblies are arranged at end portions of the bent tube, so as to transmit power generated by motion of the magnetic portion to the end portions of the bent tube.

The force transmission assemblies comprise springs, rubber bands or ropes, ends of the force transmission assemblies are connected to the magnetic portion, and another ends of the force transmission assemblies are connected with the end portions of the bent tube.

Magnetic induction lines of the magnetic portion have a central axis consistent with a line connecting center points of cross sections of the bent tube.

As a further technical solution of the present invention, a curvature of the bent tube is adjustable;

the bent tube comprises a silicon rubber round tube or a soft plastic round tube with built-in shaped metal springs; and the bent tube comprises a plurality of tube segments which are connected successively, adjacent tube segments are in closed connections or have in-between gaps, and sizes of the gaps are all smaller than a size of the magnetic portion.

As a further technical solution of the present invention, inner cross sections of the bent tube are circular or polygonal;

the magnets are all of spherical structures; and the end portions of the bent tube are further provided with noise reduction assemblies and the noise reduction assemblies comprise soft rubber gaskets.

The force transmission assemblies are configured to be strong magnetic pieces provided at the end portions of the bent tube repelling the magnetic portion.

Compared with prior art, the present invention has following beneficial effects:

In the present invention, a bent tube is arranged and has an adjustable curvature, inside the bent tube is arranged a magnetic portion which conducts reciprocating motion along a curved path, at end portions of the bent tube are arranged force transmission assemblies so as to transmit power generated by motion of the magnetic portion to the end portions of the bent tube. Compared with the prior art, the present invention can effectively transmit strokes and is applicable for massage of different body parts at different angles, thereby achieving an improved massage effect.

Figure 1:
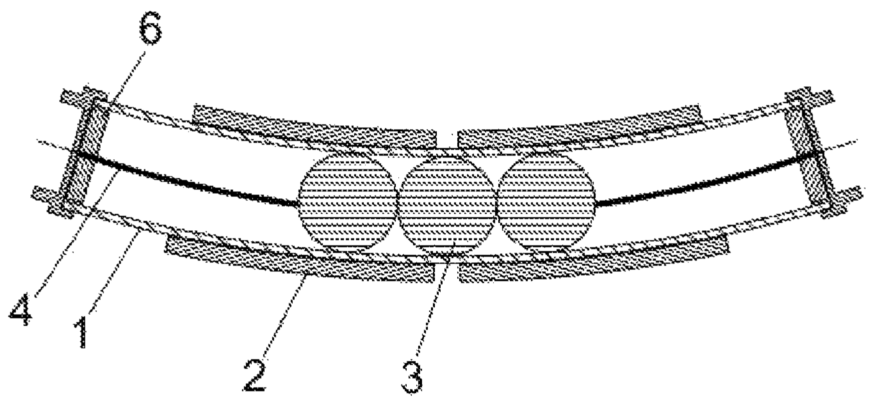
FIG. 1 is a first structural view of an electromagnetic percussion massager employing arc motion in the present invention.

The markups in the drawings are indicated as follows: 1—bent tube; 2—electromagnetic coil; 3—magnetic portion; 4—force transmission assembly; 5—circuit control module; and 6—noise reduction assembly.

SPECIFIC EMBODIMENTS

The technical solutions of the present invention will be described in further detail below in conjunction with specific embodiments.

Embodiments of the present invention are described in details below, and examples of the embodiments are shown in the attached drawings, identical or similar labels indicate identical or similar elements or components having same or similar functions throughout the description. The embodiments described below by reference to the attached drawings are exemplary and are intended only to explain the present invention, and shall not be understood as limitations of the present invention.

Figure 2:
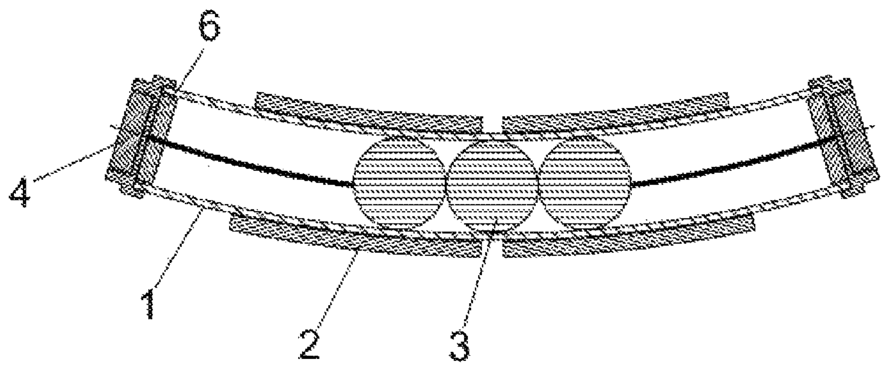
FIG. 2 is a second structural view of the electromagnetic percussion massager employing arc motion in the present invention.
Figure 3:
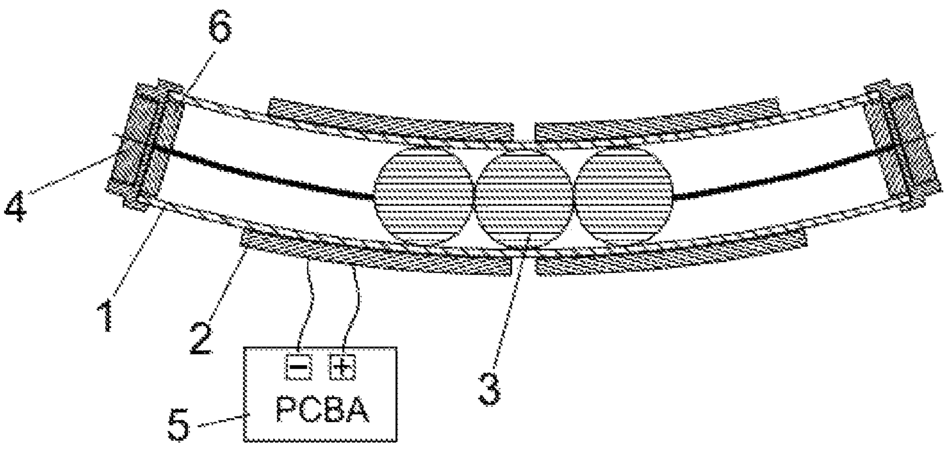
FIG. 3 is a third structural view of the electromagnetic percussion massager employing arc motion in the present invention.

Please refer to FIGS. 1~3, an embodiment of the present invention provides an electromagnetic percussion massager employing arc motion, comprising a bent tube 1, electromagnetic coils 2, a magnetic portion 3, force transmission assemblies 4 and circuit control modules 5, wherein the magnetic portion 3 is movably arranged inside the bent tube 1, the electromagnetic coils 2 are arranged outside the bent tube 1 to drive the magnetic portion 3 to reciprocate inside the bent tube 1, ends of the force transmission assemblies 4 are connected with the magnetic portion 3, and another ends of the force transmission assemblies 4 are connected with end portions of the bent tube 1 so as to transmit power generated by motion of the magnetic portion 3 to the end portions of the bent tube 1.

The electromagnetic coils 2 are electrically connected with the circuit control modules 5, directions and magnitudes of currents transmitted to the electromagnetic coils 2 are adjusted though the circuit control modules 5 so as to drive the magnetic portion 3 to reciprocate inside the bent tube 1 along a line connecting center points of cross sections of the bent tube 1, and the magnetic portion 3 reciprocates to interact with the force transmission assemblies 4 and generate power which is then transmitted from the force transmission assemblies 4 to the end portions of the bent tube 1, thereby achieving massage operations.

Figure 4:
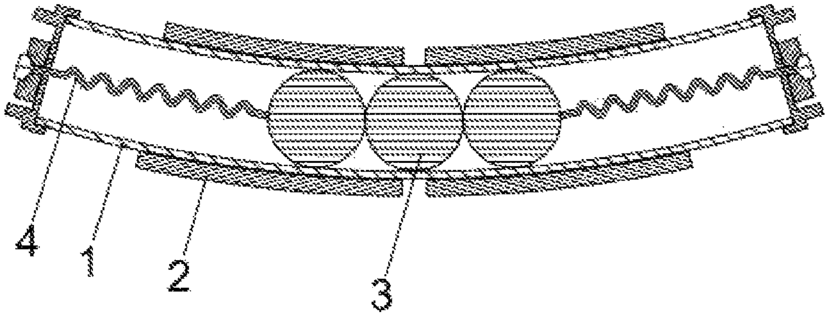
FIG. 4 is a fourth structural view of the electromagnetic percussion massager employing arc motion in the present invention.
Figure 7:
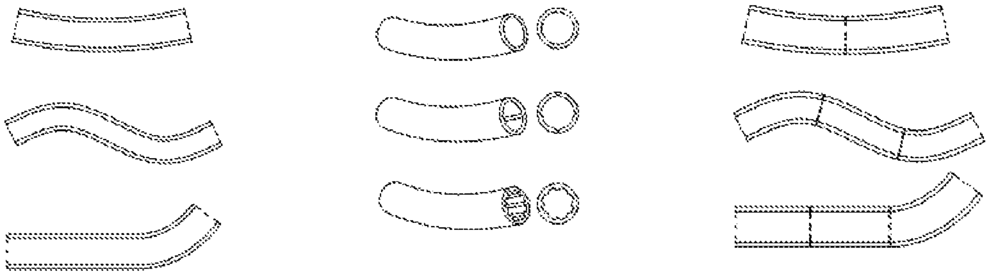
FIG. 7 are structural views showing configuration of a bent tube of the electromagnetic percussion massager employing arc motion.

Please refer to FIG. 4 and FIG. 7, in an embodiment of the present invention, the bent tube 1 is of an arc structure or an S-shaped structure, or any combination of both structures, which is not limited here, the bent tube 1 is made of bendable plastic or rubber, etc., so that a curvature of the bent tube 1 can be adjusted arbitrarily, inner cross sections of the bent tube 1 are circular or polygonal, the bent tube 1 comprises a plurality of tube segments which are connected successively, and adjacent tube segments are in closed connections or have in-between gaps, as long as sizes of the gaps are all smaller than a size of the magnetic portion 3, so that the magnetic portion 3 moves in the bent tube 1 comprising the plurality of tube segments without slipping out of the gaps.

Figure 5:
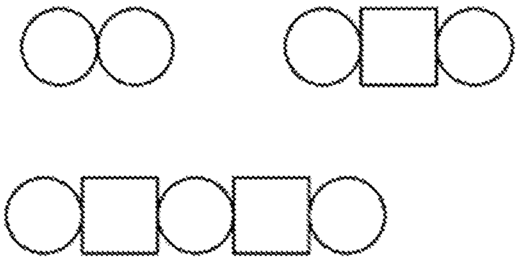
FIG. 5 is a first view showing structures of a magnetic portion of the electromagnetic percussion massager employing arc motion.
Figure 6:
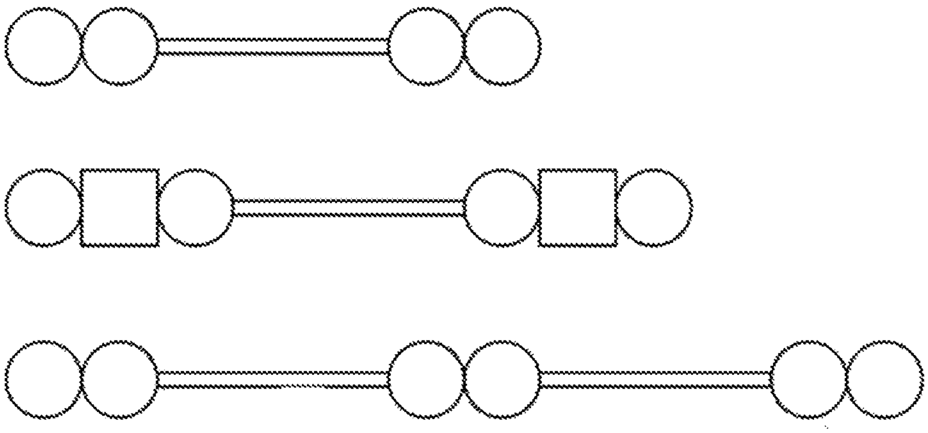
FIG. 6 is a second view showing the structures of the magnetic portion of the electromagnetic percussion massager employing arc motion.

Please refer to FIGS. 4~6, in an embodiment of the present invention, the magnetic portion 3 comprises two or more magnets, the two or more magnets are linearly arranged inside the bent tube 1, adjacent magnets are attached to each other through magnetic attraction or connected through flexible pieces, the flexible pieces are rubber bands or rope bodies, such connections through flexible pieces facilitate motion of the magnets inside the bent tube 1, ends of the force transmission assemblies 4 are connected with the magnetic portion 3, and the electromagnetic coils 2 drives the two or more magnets to reciprocate inside the bent tube 1 and generate power which is transmitted by the force transmission assemblies 4 to the end portions of the bent tube 1, thereby achieving massage operations.

In an embodiment of the present invention, the magnets of the magnetic portion 3 are all of spherical structures.

Please refer to FIGS. 5~6, in an embodiment of the present invention, at least one of each two adjacent magnets is configured to have circular arc or spherical end faces, such that, when attached to each other through magnetic attraction, the adjacent magnets are in point contacts, so as to facilitate motion of the magnets inside the bent tube 1.

The magnets are of spherical structures, therefore reciprocating movement of the magnets inside the bent tube 1 that is of different configurations is facilitated.

In actual use, an embodiment of the present invention is provided with two force transmission assemblies 4, ends of the two force transmission assemblies 4 are respectively connected with two ends of the magnetic portion, another ends thereof are respectively connected with two ends of the bent tube 1, such that, the two ends of the bent tube 1 are pushed simultaneously to move when a plurality of the magnets move, the two force transmission assemblies 4 comprise springs, rubber bands or rope bodies, etc., which are not limited herein, and what should be noted is that when the force transmission assemblies 4 are configured to be two, the two force transmission assemblies 4 can be made of the same material or different materials, and by combination of two different materials connection between the force transmission assemblies 4 and the end portions of the bent tube 1 can be done.

In an embodiment of the present invention, at the end portions of the bent tube 1 are arranged strong magnetic sheets 4 which repel the magnetic portion 3, and when the magnetic portion 3 reciprocates, power generated by motion of the magnetic portion 3 can be transmitted to the end portions of the bent tube 1 through the repulsion.

Please refer to FIGS. 1~3, in an embodiment of the present invention, the end portions of the bent tube 1 are further provided with noise reduction assemblies 6, and the noise reduction assemblies 6 absorb noise generated by motion of the magnetic portion 3.

The noise reduction assemblies 6 in the above embodiment comprise soft rubber gaskets.

In embodiments of the preset invention, the electromagnetic coils 2 are electrically connected with the circuit control modules 5, directions and magnitudes of currents transmitted to the electromagnetic coils 2 are adjusted though the circuit control modules 5 so as to drive the magnetic portion 3 to reciprocate inside the bent tube 1 along a line connecting center points of cross sections of the bent tube 1, and the magnetic portion 3 reciprocates to interact with the force transmission assemblies 4 and generate power which is then transmitted from the force transmission assemblies 4 to the end portions of the bent tube 1, thereby achieving massage operations.

The preferred embodiments of the present invention have been described in details above, but the present invention is not limited to the above-mentioned embodiments. Within the scope of knowledge possessed by those of ordinary skill in the art, various changes can also be made without departing from the purpose of the present invention.

The invention claimed is:

1. An electromagnetic percussion massager employing arc motion, comprising a bent tube, electromagnetic coils, a circuit control module, a magnetic portion and force transmission assemblies, wherein the electromagnetic coils are arranged outside the bent tube and electrically connected with the circuit control module;

the magnetic portion is movably arranged inside the bent tube and comprises two or more magnets, the two or more magnets are linearly arranged inside the bent tube, the two or more magnets are attached together through magnetic attraction or connected through flexible pieces, and when the two or more magnets are attached together through magnetic attraction, at least one in adjacent ones of the two or more magnets is provided with an arc-shaped or spherical end face; and the force transmission assemblies are arranged at end portions of the bent tube, so as to transmit power generated by motion of the magnetic portion to the end portions of the bent tube;

wherein the force transmission assemblies comprise springs, rubber bands or ropes, ends of the force transmission assemblies are connected to outermost magnets of the linear arrangement of the two or more magnets, and opposite ends of the force transmission assemblies are connected with the end portions of the bent tube.

2. The electromagnetic percussion massager employing arc motion according to claim 1, wherein a curvature of the bent tube is adjustable.

3. The electromagnetic percussion massager employing arc motion according to claim 1, wherein the bent tube comprises a silicon rubber round tube or a flexible plastic round tube with at least one built-in metal spring.

4. The electromagnetic percussion massager employing arc motion according to claim 1, wherein the bent tube comprises a plurality of tube segments which are connected successively, the plurality of tube segments are in closed connections or have in-between gaps, and sizes of the gaps are all smaller than a size of the magnetic portion.

5. The electromagnetic percussion massager employing arc motion according to claim 1, wherein inner cross sections of the bent tube are circular or polygonal.

6. The electromagnetic percussion massager employing arc motion according to claim 1, wherein the two or more magnets are all of spherical structures.

7. The electromagnetic percussion massager employing arc motion according to claim 1, wherein the end portions of the bent tube are further provided with noise reduction assemblies and the noise reduction assemblies are flexible rubber gaskets.

8. An electromagnetic percussion massager employing arc motion, comprising a bent tube, electromagnetic coils, a circuit control module, a magnetic portion and force transmission assemblies, wherein the electromagnetic coils are arranged outside the bent tube and electrically connected with the circuit control module;

the magnetic portion is movably arranged inside the bent tube and comprises two or more magnets, the two or more magnets are linearly arranged inside the bent tube, the two or more magnets are attached together through magnetic attraction or connected through flexible pieces, and when the two or more magnets are attached together through magnetic attraction, at least one in adjacent ones of the two or more magnets is provided with an arc-shaped or spherical end face; and the force transmission assemblies are arranged at end portions of the bent tube, so as to transmit power generated by motion of the magnetic portion to the end portions of the bent tube;

wherein the force transmission assemblies comprise strong magnetic sheets, the strong magnetic sheets are arranged at the end portions of the bent tube and repel the magnetic portion so as to realize force transmission.

9. The electromagnetic percussion massager employing arc motion according to claim 1, wherein magnetic induction lines of the magnetic portion have a central axis consistent with a line connecting center points of cross sections of the bent tube.

* * * * *